United States Patent [19]
Miller

[11] 3,831,252
[45] Aug. 27, 1974

[54] ASSEMBLING AND SECURING MACHINE

[76] Inventor: Charles Frederick Miller, 2165 N. Glassell, Orange, Calif. 92667

[22] Filed: Apr. 16, 1973

[21] Appl. No.: 351,226

[52] U.S. Cl. ............................. 29/203 B, 29/203 P
[51] Int. Cl. ......................................... H05k 13/00
[58] Field of Search........ 29/203 P, 149.5 A, 203 B, 29/203 R, 149.5 R; 308/9; 74/491

[56] References Cited
UNITED STATES PATENTS

| | | | |
|---|---|---|---|
| 2,683,636 | 7/1954 | Wilcox | 29/149.5 A |
| 3,201,181 | 8/1965 | Cherbim | 308/9 |
| 3,474,685 | 10/1969 | Miller | 74/491 |

Primary Examiner—Thomas H. Eager
Attorney, Agent, or Firm—Grover A. Frater

[57] ABSTRACT

An assembling and securing machine is disclosed which is capable of positioning a tape, such as a strip of film on which circuit runs are imprinted. The tape is positioned relative to a component to be bonded to those circuit runs and to a work tool by which the bonding is completed. There is a need to align the tool, circuit run, and component to compensate for manufacturing variations in their positions and dimensions and the instrument is arranged so that compension for those variables are possible and easily accomplished.

17 Claims, 10 Drawing Figures

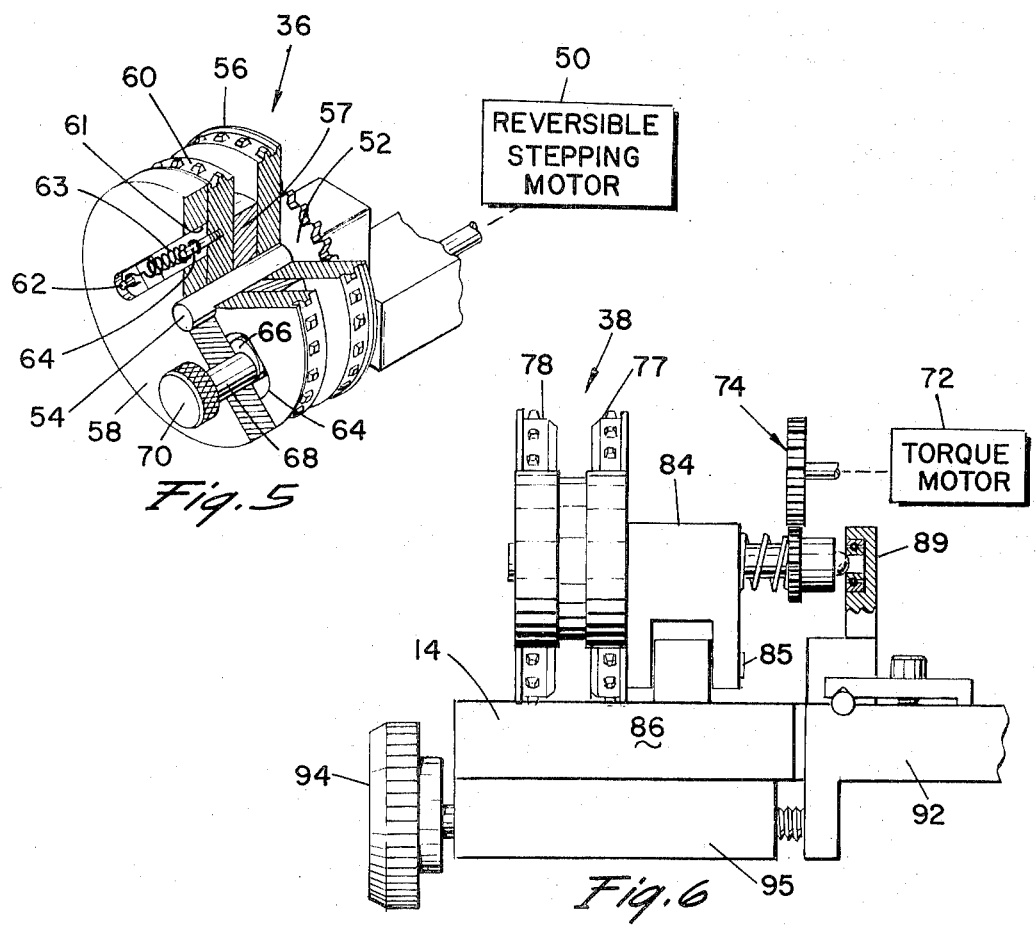
Fig.5
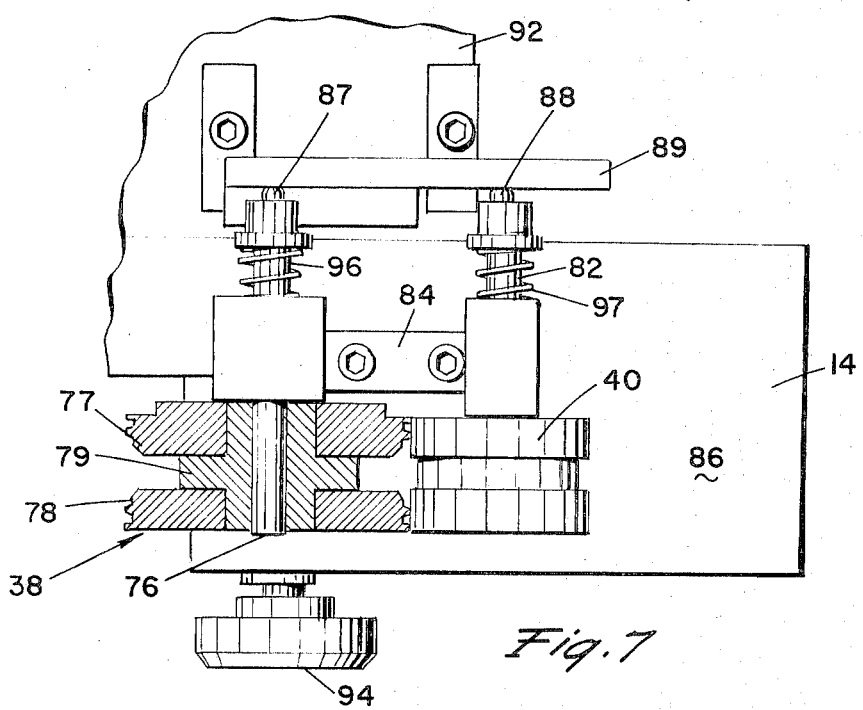
Fig.6
Fig.7

ASSEMBLING AND SECURING MACHINE

This invention relates to improvements in assembling and securing machines of a kind that are called "bonding machines" or "bonding instruments" in the electronics industry. It relates particularly to a machine by which electronic components may be bonded to circuit elements which are formed on a tape, or are carried by the tape, at points along its' length.

Techniques have been developed by which electric circuit paths are formed on a length of tape. The circuit elements are reproduced at spaced points along the length of the tape. They are composed of conductive metal and they are arranged so that they match the terminals or contact points of discreet circuit elements that are to be bonded to the conductors. In one form these new processes employ photographic techniques to create circuit paths of silver metal on a strip of photographic film which is perforated along one or both edges in the manner of reel-to-reel type motion picture film. The circuit run configuration is duplicated at uniform intervals along the length of the film. The elements to be bonded to those circuit runs may be any of a wide variety of electronic elements but the process is particularly useful when the element to be attached is a multiple contact, semi-conductor device or integrated circuit device of micro-miniature size. In one application the element to be bonded to the circuit run is an integrated circuit whose connection terminals are pre-tinned. The task is to place that integrated circuit element on the film so that its connection terminals overlie appropriate circuit runs. That having been done, heat is applied so that the solder of the terminals is melted and flows into intimate contact with the silvered circuit runs. A bond is completed when heat is removed and the solder is permitted to resolidify. The invention is not limited to reflow solder bonding applications but is also applicable to thermal compressive bonding, sonic bonding, and other bonding methods.

The object of this invention is to provide a means by which the circuit runs on the film or strip and the component to be bonded to it and the tool by which bonding will be accomplished are all properly aligned. The embodiments selected for illustration are suitable for use in cases in which it is desired to complete as many as half a dozen or more bonds between an integrated circuit chip and circuit runs that are less than one-thousandth of an inch wide and are spaced apart by only a few thousandths of an inch. The work is viewed through a very high-powered stereo microscope and the apparatus is capable of bringing the film strip, the component to be added, and the work tool together in a way that permits relatively high-speed production notwithstanding the deviation in the physical dimensions of the added element and film strip that normally occurs during manufacture.

Other objects and advantages of the invention are that an operator of the apparatus can make position adjustments easily, accurately and quickly in a way that results in minimum fatigue and in minimum error. The position adjustment apparatus of the preferred embodiments can tolerate a substantial degree of warping and twisting of the film at the work point without adverse effect on the quality of the bonds.

Two embodiments of the invention have been selected for illustration. Both of these instruments employ means to mark a reference line to be utilized in aligning the circuit and the component to be added and the tool. In this case that index mark is incorporated in the microscope that forms part of the instrument. It is most convenient to position the circuit and component on a vertical reference line so that gravity is an advantage rather than a hindrance in positioning the work and in accomplishing alignment. In that arrangement it is most convenient to utilize a bonding tool that is positioned above the work between the work and the microscope. That is not essential in the invention but it is one of the features of the instruments shown in the drawings.

The tool is made retractible so that it can be placed over the work and then removed from the field of work when a new circuit run and component are placed in the work position. In both of these instruments the tool is mounted on a base that serves also as the base for the microscope and one or the other of the tool and microscope reference mark is moved so that the reference point of the microscope can be placed directly over the tool when the tool is in working position. The tool is then retracted so that the circuit run on the tape is visible through the microscope. Next the tape which carries the circuit run and the frame are moved relative to one another so that the circuit run is in proper position under the reference point carried by the microscope. In these instruments it is the tape rather than the frame that is moved.

Some means is employed for positioning the component relative to the circuit run of the tape. The component may be placed on top of the tape and in that case there would ordinarily be an anvil below the tape to support it while the work tool was doing its task. Use of a transparent tape, such as a strip of photographic film, permits an arrangement in which the circuit runs are imprinted on the lower side of the film and in which the added component is bonded to the underside of the film. The added component is carried by a holder which serves also as an anvil for the component and the circuit run as the tool is applied to them from above.

By this arrangement the working position of the tool is made the ultimate reference. That reference position is recorded and preserved in the position of the cross hairs of the microscope or the point at which a light beam impinges on the work place. Many of the feed mechanisms by which added components are brought to the work place are precision mechanical instruments which bring successive components to exactly the same place. In that circumstance it is necessary only to arrange the feed mechanism so that it delivers the component to be added to a point directly under the cross hairs of the microscope. That having been done, it remains only to position the circuit run so that it too is oriented directly under the cross hairs of the microscope. Vertical positioning of the tape is no problem because the tape is both thin and flexible. It is transported across the work position at a level only slightly above (or below) the level at which the components are placed. The tool is made to move in a plane at a level just slightly above. When tool, tape and component are aligned, the tool is pressed down, in the Z direction, the force the tape and its circuit run into contact with the component.

The more difficult task is to position the tape in the X and Y direction, as distinguished from the Z direction just described. In the invention the tape, or film is perforated along its length. The perforations match sprockets on a sprocket wheel or wheels that control the degree in which the tape is transported or displaced across the work place to bring successive sets of circuit runs into position at the work place. Once the circuit runs are imprinted or formed on the tape, variations in spacing between circuit runs can be accommodated only by transporting the tape relative to the work place. The invention employs a means for transporting the tape in uniform increments of displacement whereby the tape can be advanced from one circuit run to the next automatically or at least digitally in steps if done manually. The invention also includes a means for transporting or translating the tape in additional degree by stepping through added increments (in either direction) and the preferred embodiment includes a means for transporting the tape in selected degree less than one of the incremental steps in translation.

It is not enough to be able to move a tape so that its circuit run occupies the correct position relative to the reference mark. It is required also that it be held there while the bond is being completed. In the invention the tape is held taut over the work place. That requires that it be held on both sides of the work place and that the means for holding it there be capable of accommodating the step-by-step translation of the tape. In addition, the holding means must also be capable of accommodating microtranslation through less than a complete step to accommodate position errors less than a whole step in amount.

The positioning problem is further complicated because the variations in circuit run position on the tape are not limited to variations in separation between successive circuit runs. A circuit run can also be displaced in the dimension perpendicular to the direction in which the tape is transported. Adjustment to overcome that variation requires that the tape position be adjusted transversely while the tape is being held taut in its line of transport. The invention also includes a means by which that task may be accomplished.

Two instruments are shown in the drawing. Only part of one instrument is shown. It includes a means by which the entire tape transport mechanism including the overriding corrective position correcting mechanism, can be adjusted relative to the reference mark. That form of the machine is capable of correcting for very wide variations in the placement of the circuit runs on the tape or film. The other machine does not include that kind of adjustment.

IN THE DRAWINGS:

FIG. 5 is an isometric, partly fragmented, and partly schematic view of a sprocket wheel drive employed in the embodiment of FIG. 1;

FIG. 6 is a view in end elevation of the other sprocket wheel set of FIG. 1 together with its idler and position adjustment mechanism, one of the bearings being shown in cross-section and the torque motor being shown schematically;

FIG. 7 is a top plan view of the apparatus shown in FIG. 6 with the sprocket wheel assembly shown in cross-section;

Figure 1:
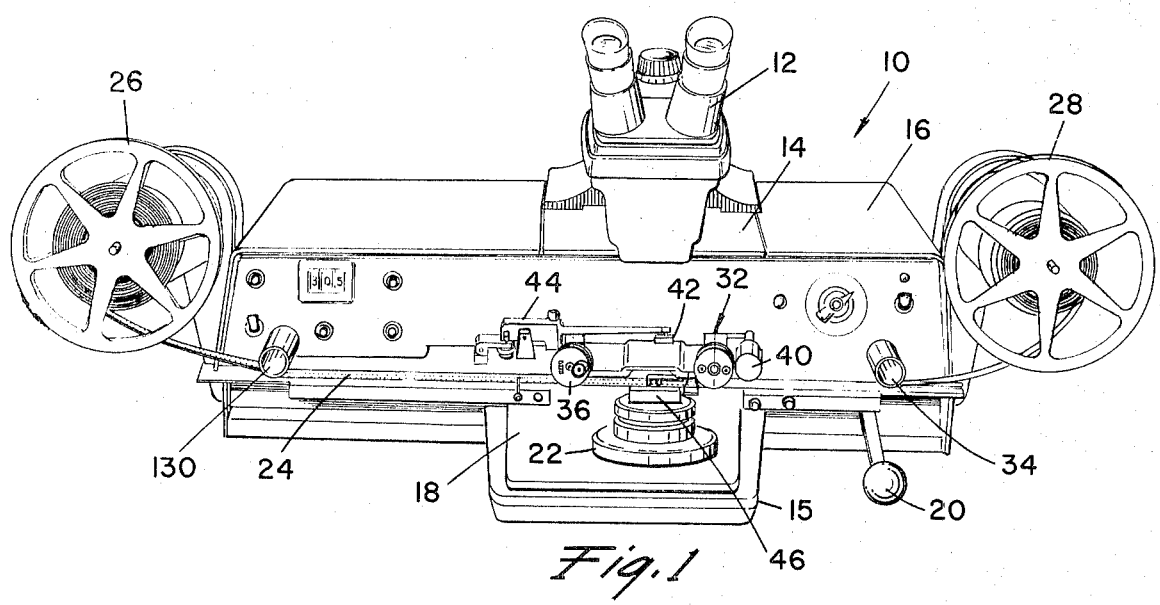
FIG. 1 is an isometric view of an assembling and securing machine seen from a position in front of and above the machine and embodying the invention.

The assembling and securing machine or "bonding instrument" 10 shown in FIG. 1 includes a stereo microscope 12 which is mounted on the frame 14 of the instrument. Part of the frame can be seen above the case 16 and part of it can be seen below the case, where part of it extends forwardly to form a flat shelf 15 on which rests a movable work table 18. Manipulation of the table positioning handle 20 will move the work table 18 from side-to-side in the X direction and toward and away from the front edge of the platform 15 in the Y direction.

A work holder 22 rests on the work table 18. Its function is to preheat, position, and support a component that is to be bonded to circuit runs that are formed on the underside of a tape 24 which in this case has the form of a perforated photographic film strip.

A motorized delivery reel 26 is mounted at the left side of the instrument in FIG. 1. A motorized take-up reel 28 is mounted at the right. The film strip extends from the delivery reel 26, under a delivery idler 30, to a transport mechanism generally designated 32 and then to a take-up idler 34 and finally to the take-up reel 28.

The transport mechanism includes a motor-driven delivery toothed sprocket wheel structure 36, a motor-driven toothed sprocket wheel take-up structure 38 and its companion idler 40.

The space between the delivery sprocket structure 36 and the take-up sprocket structure 38 is generally called the work region. The actual work position is a smaller area in this region. The tool 42 is carried at the end of an arm on the tool holder 44. A drive mechanism, which cannot be seen in FIG. 1, swings th tool holder so that the tool is moved in a horizontal plane to the work position over the film and over the component to be added to the film. The letter is carried on the top face of the work holder 22.

In operation of the instrument, one of the controls on the face of the cabinet is actuated so the tool holder 44 swings the tool 42 into the work position. Using an adjustment structure not shown, the operator of the instrument adjusts a cross hair or light spot mechanism carried by the stereo microscope 12 so that the point of crossing of the cross hairs, or the position of the light spot, is centered on the tool 42 or a target on the holder. Then the tool holder is retracted to the position shown in FIG. 1 so that one looking through the stereo microscope 12 sees the cross hairs and the film strip 24. Using one of the controls on the front panel of the instrument the operator actuates the transport mechanism so that the film advances to place a circuit run in proper position under the cross hairs. The circuit run is visible through the perforated or transparent film. In some cases the circuit run is placed on top of the tape.

If it has not already been done, the component to be added to that circuit is placed in a holder or tray 46 that rests atop the work holder 22. In most cases that tray will be arranged so that rotation of the work holder will bring the next component to be attached to a point below the circuit formed on the film. A number of arrangements are possible.

The transport mechanism 32 includes a means by which the operator may make minor adjustments to transport the film across the work space in the X direction and to move the film in the Y direction if that is necessary. As previously described the operator can move the component to be added relative to the cross hairs or light reference spot by manipulation of the knob 20 to move the work table 18 relative to the frame platform 15.

THE FILM TRANSPORT MECHANISM

Both the delivery sprocket wheel and the take-up sprocket wheel are motor driven. The drive motors are shown schematically. Sprocket wheel 36 is driven by a reversible stepping motor 50 through a gear train that includes gear 52. The output of that gear train is a shaft 54 which is fixed to outer disc 58. Inner toothed wheel 56 and outer toothed wheel 60 and separator 57 are fixed to one another but are not fixed to the shaft 54. The outer disc is formed with a slot 61 which extends entirely through the disc except at its lower end where a web remains. A pin 62 is secured in that web and it forms the anchor for one end of a spring 63 whose other end is carried by a pin 64. Pin 64 is fixed to the outer toothed wheel 60 and extends into the slot 61. Thus arranged, the tension spring 63 tends to cause rotation of the toothed wheels counterclockwise relative to the outer disc 58 and pin 54.

An oval shaped slot 64 is formed in the outer surface of the outer toothed wheel 60. The side wall of that slot serves as a follower for a cam 66. The cam 66 is a circular disc mounted off center on the end of a shaft which extends through a round opening in the outer disc 58. A knob 70 is fixed to the outer end of the shaft 68. When the knob 70 is rotated, the cam 66, bearing against the side walls of slot 64, causes the toothed wheels 56 and 60 to be rotated relative to the outer disc 58 and shaft 54 against, or with, the bias of spring 63. Thus this structure includes a means by which the sprocket wheel can be rotated in small degree relative to the output position of the reversable stepping motor 50. The film, whose drive openings engage the teeth of the sprocket wheel may be transported across the work space in a degree less than a whole step of the stepping motor.

FIG. 6 illustrates the other sprocket wheel 38. It is driven by a torque motor 72 through a gear set 74 and drive shaft 76. The inner toothed wheel 77 and the outer toothed wheel 78 of the sprocket wheel 38 are both fixed to the shaft 70 as best shown in FIG. 7 where the assembly of those toothed wheels and the center collar 79 is shown in cross-section. The torque motor is arranged so that, when energized, it applies a torque continually tending to rotate the toothed wheels to draw the film across the work space from the toothed delivery wheel structure 36. The idler 40 is fixed to a shaft 82. Both the idler shaft 32 and the pick-up sprocket wheel structure 38 are mounted on a bearing structure 84 which is pivotly mounted on shaft 85 to a platform 86 that forms a part of base 14.

The shaft 76 and 82 are slidable in the bearing housing 84. They and the sprocket wheel 38 and the idler 40 are retracted so that the rounded ends 87 and 88 of the shafts engage bearings housed in a cross-bar 89 as best shown in FIG. 6. That cross-bar is carried by a member 92 only part of which is shown but which is free to move in the Y direction relative to the frame 14. An adjustment screw 94 has its inner end threadedly engaged in an opening through a lip 93 which extends down from member 92. The shank of adjustment screw 94 is fixed relative to, but is rotatable in, a block 95 which is carried by and fixed to the lower side of platform 86.

When the adjustment screw 94 is rotated, member 92 and cross-bar 89 are moved in the Y direction which is the direction of the axis of shafts 76 and 82. If the screw 94 is rotated in one direction member 92 and cross-bar 89 are moved toward platform 86 whereby the bearings in cross-bar 89 bear upon the rounded ends 87 and 88 of the shaft 76 and 82 forcing them against the bias of springs 96 and 97 such that the sprocket wheel 38 and the idler 40 are moved away from the bearing block 84 toward the operator in front of the machine of FIG. 1. Rotation of the screw 94 in the opposite direction moves the member 92 and cross-bar 89 away from bearing block 84. The springs 96 and 97 force the shafts to follow the cross-bar and the sprocket wheel 38 and the idler 40 are returned to the inner position in the direction away from an operator sitting before the instrument. Thus it is that a small amount of movement of sprocket wheel 38 and idler 40 may be made in the Y direction to compensate for Y direction errors in the position of circuit elements formed on the film.

THE TOOL AND TOOL HOLDER

The tool holder 44 and the tool 42 are shown retracted in FIG. 1. After the component on the tray 46 and the circuit imprinted on the tape 24 have been aligned with the cross hairs visible through the stereo microscope 12, the tool holder 24 must be pivoted so that the tool 42 is carried over into vertical alignment with the cross hairs, with the circuit runs and with component to be added. Having reached that position it is necessary that the tool move downwardly into contact with the work.

Figure 2:
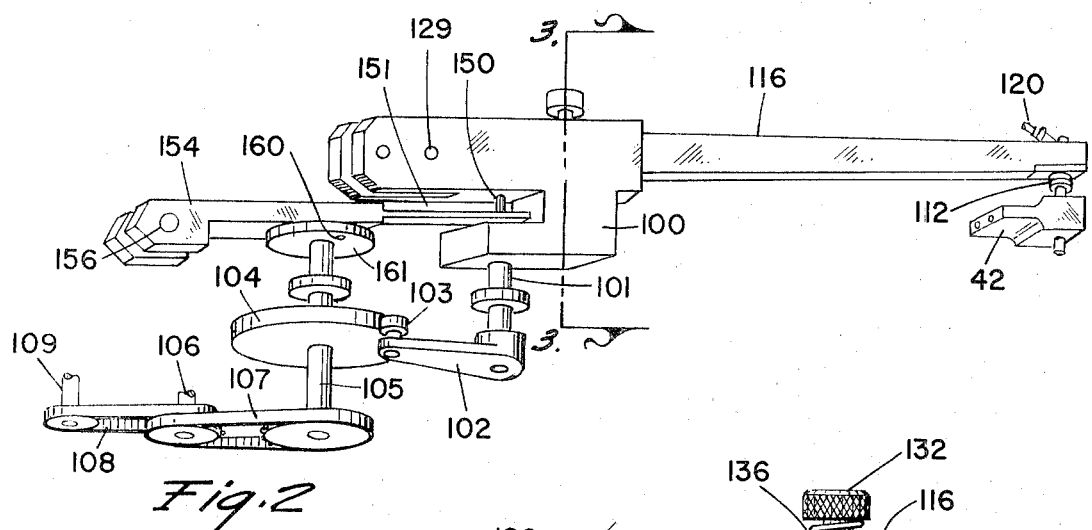
FIG. 2 is an isometric view, shown partly fragmented, of the tool, work tool holder, and part of the work tool holder drive mechanism.

The essentials of the tool holder and its drive mechanism are shown in FIG. 2. It comprises a main yoke 100. The yoke is a bifurcated support member which is fixed to a vertical shaft 101. An arm 102 is fixed to the lower end of that shaft. It carries a cam follower in the form of a roller 103 at its outer end. That roller rides on the rim of a cam 104. The cam is fixed to and is rotatable with shaft 105. Shaft 105 is driven by a motor, now shown, which turns input shaft 106. Rotation is transmitted from input shaft 106 to the cam shaft 105 through a pulley and belt set 107. Another pulley and belt set 108 transmits rotation of input shaft 106 to a shaft 109 whose rotation actuates a series of microswitches. Those microswitches perform a number of functions including controlling application of bonding energy to the tool 42.

Figure 4:
FIG. 4 is a cross-sectional view of the tool holder taken at a point where the tool is attached to it.

That tool 42 is shown at the right in FIG. 2. It is connected to a fitting 112 which is secured to the lower hemispherical part 114 of an air bearing structure which is formed in the end of the rocker arm 116. The construction is shown in FIG. 4. The hemispherical part 114 is threaded onto a retaining screw 118 whose shank fits loosely through an opening that extends from the bottom of a hemispherical recess formed in the underside of the rocker arm to the top of the arm. The clearances in FIG. 4 have been greatly exaggerated for the sake of clarity. Air is forced into the space between the hemisphere 114 and the hemispherical cavity in the rocker arm by an air input conduit 120. This arrangement permits a small amount of movement of the working end of the tool to compensate for lack of flatness or parallism in the tool end or in the work.

The arm 116 is pivoted on the yoke by the pin 129. The force opposing pivoting is provided by the structure shown in FIG. 3. The arm is bored through vertically in the region of the yoke. The upper and lower portions of that bore are enlarged so that a relatively thin horizontal web 130 remains. The diameter of the opening in that web is somewhat larger than the shank of the knurled head 132 of a machine screw whose shank extends through that web opening to threaded connection with the lower portion of the yoke 100. The position of the arm 116 is maintained generally by the opposing action of a compression spring 134, which is trapped between web 130 and the inner bottom wall of the yoke, and by a compression spring 136, which is trapped between the web 130 and the underside of head machine screw 132. This arrangement permits adjustment of the positioning bias on arm 116 while permitting a rotation of the arm at the web 130 relative to the screw 132 so that the tool can be lowered.

Figure 3:
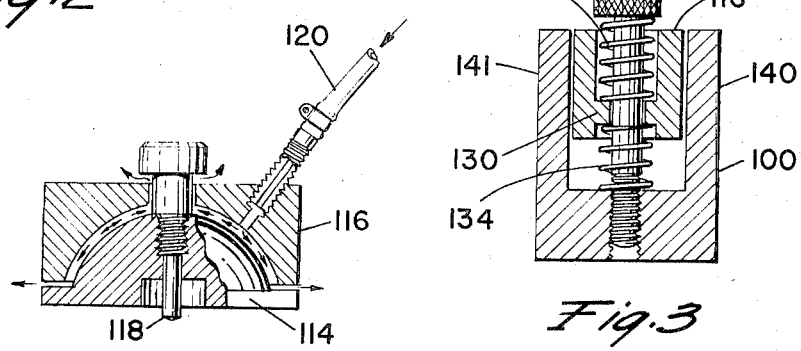
FIG. 3 is a cross-sectional view taken on Line 3—3 of FIG. 2.

In FIG. 3 the clearance between the arm 116 and the sides 140 and 141 of the yoke has been exaggerated to make it clear that the arm 116 is free to move relative to the yoke. In practice that clearance is very small so that horizontal rotation of the arm relative to the yoke and to the axis of the screw 132 is not permitted. When the yoke 100 is rotated by action of cam 104 to follower 103 arm 102 and shaft 101, the arm 116 rotates with the yoke.

Figure 10:
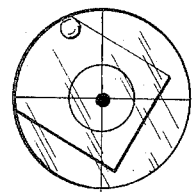
FIG. 10 is a diagram illustrating how the cross hairs of the microscope are aligned and centered on a reference point on the work tool holder.

A pin 150 projects down from the underside of the rear portion of arm 116. That pin is fixed to the arm 116 and it serves as a cam follower in connection with cam lever 151 which is carried by a pivoted arm 154. Arm 154 is carried on a pivot shaft 156 which is fixed to the frame. The arm 154 is free to oscillate in a vertical plane parallel to the axis of rotation of yoke 100 and cam shaft 105. It is driven to oscillation by an eccentric pin 160 which extends upwardly from a pin disc 161 into engagement with the underside of arm 154. Cam lever 151 oscillates in a plane just above the plane of the lower end of pin 150 so that each time that the cam lever 151 engages the pin, the arm 116 is rotated on pivot pin 129 in a direction to lower the tool 42. The position of the eccentric pin 160 and the slot in which it moves and the shape of cam 104 and the length of arm 102 are all adjusted so that lever 151 engages pin 150 only after the yoke 100 and arm 116 have been rotated horizontally to carry the tool to the work position. FIG. 10 illustrates what the operator sees when looking through the stereo microscope after the tool arm is in position at the work place. In FIG. 10 the magnification is shown to be less than it would ordinarily be when bonding microcircuit components.

MICROMANIPULATORS

Figure 8:
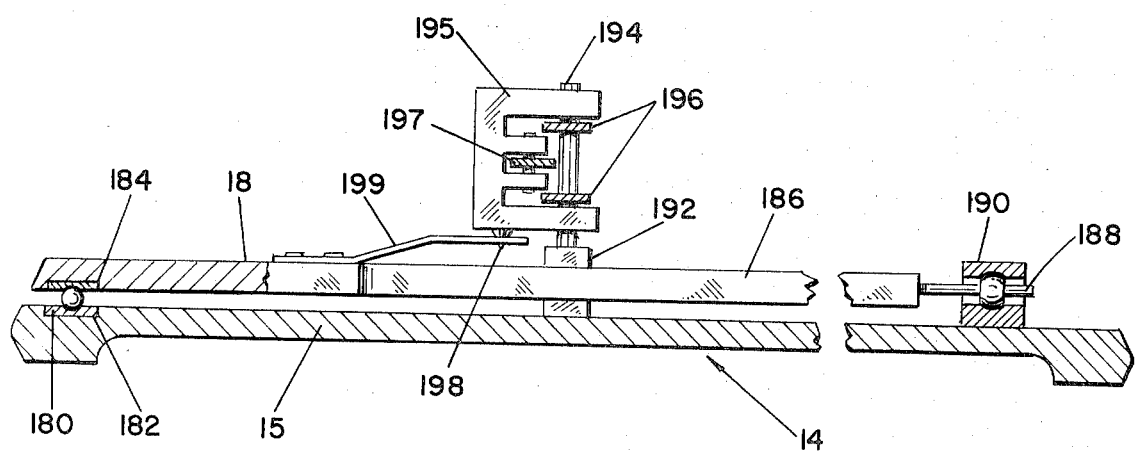
FIG. 8 is a sectional view showing a fragment of the mechanism by which the work table of FIG. 1 is moved relative to the frame.

A pantograph, micro-positioning mechanism is described in U.S. Pat. No. 3,474,685, issued 28 Oct., 1969 to Charles Frederick Miller. The embodiment of FIG. 1 in the accompanying drawing includes a micro-positioner of that kind. Its ball handle 20 is visible in FIG. 1. The manner in which the micro-manipulator is associated with the frame of the instrument and work table 18 is illustrated in FIG. 8. The work table 18 is supported on the frame 14 at three points two of which are shown in FIG. 8. Returning to FIG. 1, the work table 18 overlies a forwardly projecting portion of frame 14 which is called the platform. The platform is recessed at spaced points along its front edge. One of those recesses 180 is shown in FIG. 8. A roller ball 182 is disposed in that recess. It has diameter greater than the recess depth so that its upper portion extends above the recess. A hardened flat insert is imbedded in the lower surface of the work table 18 where it rests upon the ball 182. That structure is duplicated and there are two ball supports at the front edge of the work table.

A long extension bar 186 extends rearwardly from the work table 18 to the rear portion of the instrument. At its rear end the extension bar 186 is fitted with a cylindrical rod 188 whose axis is substantially horizontal and is perpendicular to the width of the instrument. The rod extends in what has been called the Y direction. It fits slidably into a spherical ball and socket bearing 190. The rod is free to slide back and forth lengthwise through the bearing and the bearing is free to rotate in small degree. This is the third point of support.

Figure 9:
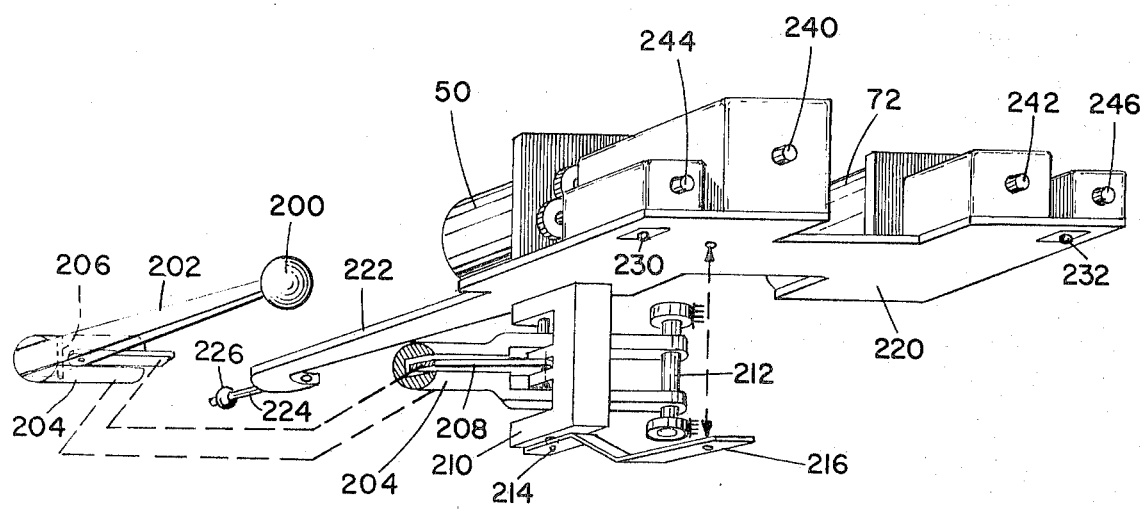
FIG. 9 is an isometric view shown partly fragmented, illustrating how the tape transport sprocket system is moved relative to the frame in a second embodiment of the invention.

Only a portion of the micro-manipulator mechanism is shown in FIG. 8. A similar mechanism is illustrated in FIG. 9 and the structure of FIG. 8 can be understood from an examination of FIG. 9. In FIG. 9 the micromanipulator comprises a ball handle 200 which is connected at the end of a first arm 202 which extends rearwardly into the instrument where it has pivotal connection to two arms. For identification those two arms will be called the second and third arms respectively. The second arm 204 is pivoted to the first arm 102 by a pin 206 which is shown in dashed lines in FIG. 9. This second arm is slotted over its length and the third arm 208 is disposed in the slot. It is pivotly connected to the first arm 202 by a pin whose axis is parallel to pin 206 but which is spaced from pin 206. As the handle 200 and lever 202 are moved in the plane perpendicular to the axis of those pins, the second 204 and third 208 arms move laterally relative to one another.

The second and the third arms procees to an E-shaped member 210. That portion of the member which corresponds to the center bar of the E is pivotly connected to the other end of third arm 208. The second arm 204 is bifurcated. It extends past the E-shaped member 210 where its other end, now a bifurcated double end, is pivotly mounted by a pin 212 which is shown symbolically fixed to the frame of the instrument. A conical pivot 214 extends downwardly from the underside of the E-shaped member 210. It fits into a receiving hole in one end of a Z-bracket 216.

If the ball 200 and the first arm 202 are moved in the horizontal plane perpendicular to the axis of pins 206 and 212 and the pivot pins at the ends of the third arm 208, then there will be relative movement between arm 204 and arm 208. Since the end of arm 204 is fixed to the frame at pivot pin 212, it is the E-shaped member 210 that must move. In the case of FIG. 9 the axis of pivot 214 is offset from the axis of the connection between lever 208 and the E-shaped member 210. The other end of the Z-shaped member 216 is fixed to the platform above it as indicated by the arrows so that there will be movement of the platform in the direction of movement of the handle 200.

If the handle 200 and arm 202 are moved n the direction of the handle 202, in the Y direction, then both of the arms 204 and 208 are caused to pivot around their pivot points. Thus arm 204 pivots around pin 212 and arm 208 pivots around its connection with the E-shaped member 210. Since lever 208 is shorter than lever 204 movement of the handle 200 in the Y direction will result in movement of the E-shaped member 210 in the Y direction. That movement results in movement of the Z-member 216 by virtue of its connection to the conical pivot 214. In FIG. 9, because the Z-shaped member 216 is fixed to the table 220 that table will be moved in the same direction as the handle 200 is moved. The table has a rearward extension 222 from whose rear end a rod 224 extends. That rod 224 fits into a spherical bearing 226 which ultimately is fixed to the frame and is rotatable relative to the frame.

Returning to FIG. 8, the block 192 is fixed to the frame 14. A pivot pin 194 is fixed to that block and it extends perpendicularly to the frame. That pin 194 corresponds to pivot pin 212 in FIG. 9. The two members 196 in FIG. 8 are the bifurcated ends of an arm that corresponds to arm 204 in FIG. 9. The E-shaped member 195 corresponds to arm 208 in FIG. 9. Conical pivot 198 corresponds to conical pivot 214 in FIG. 9, and finally Z-shaped member 199 in FIG. 8 corresponds to Z-shaped member 216 in FIG. 9. In FIG. 8 the other end of the Z-shaped member is fixed to the work table 18 and it causes movement of the table in the X and Y Directions. In the same manner, when the arms 196 and 197 are manipulated, as the Z-shaped member 216 causes movement of table 220 in FIG. 9 when its manipulator arms are moved.

To complete the comparison, extension 186 in FIG. 8 corresponds to extension 222 in FIG. 9 and rod 118 and spherical bearing 190 in FIG. 8 correspond to rod 224 and spherical bearing 226 in FIG. 9. As in the case of FIG. 8, the table 220 in FIG. 9 is supported at its forward end on two balls 230 and 232 which rest on frame members not shown in FIG. 9.

Comparison of FIGS. 1 and 8 will show that manipulation of the handle 20 in FIG. 1 will result in movement of the table 18 relative to platform 15 to carry the work holder 22 and its tray 46 in the X and Y direction so that components on the tray can be aligned with the cross hairs on the microscope.

THE SECOND EMBODIMENT

In the embodiment of FIG. 1 adjustment of film position in the Y direction is accomplished by rotating the adjusting knob 94. Doing that translates the film only at the take-up side of the work space. That is entirely adequate when variation in the circuit run position in the Y direction is very small. However, sometimes it is desired to translate the film in the Y direction without any rotation and it may be desirable to translate the film in greater degree. In that circumstance the embodiment of FIG. 1 is modified to incorporate a second manipulator at the left side of the work table 18. Instead of the toothed wheels being mounted on the frame of the instrument they and their drive systems are mounted on table 220 of FIG. 9 and that table is disposed in the instrument so that the sprocket wheels occupy substantially the positions they are shown to have in FIG. 1. In practice the tool holder 44 is moved to a position on the frame rearwardly of the table 220 and it is orientated so that the arm extends forwardly between the two sprocket wheels.

In FIG. 9 the sprocket wheels have been omitted for the sake of clarity. The sprocket wheels structure 36 would be mounted at the end of shaft 240. Structure 38 would be mounted at the end of shaft 242. There is an idler associated with each of the toothed wheel structures. The delivery idler is mounted on shaft 244 and the take-up idler is mounted on shaft 246. The torque motor 72 is the same torque motor that was employed in FIG. 6 and the reversible stepping motor 50 is the same one that is shown in FIG. 5.

OTHER FEATURES

The air bearing is a very useful feature particularly when the work is micro sized. Small variations in the orientation of the film or the plane of the working portion of the tool may result in an out-of-parallel condition that tends to prevent best bonding. In that case it is useful to be able to reorient the working portion or face of the tool without changing its position relative to the reference line. That can be accomplished by mounting the tool on the tool holder so that either the connecting part of the tool, or the holder, can move slightly relative to the reference. The air bearing permits that kind of movement.

In the embodiment shown the take-up or torque wheel assembly 38 employs a sprocket wheel similar to sprocket wheel 36. That is preferred but it is not essential. The torque wheel could be replaced with pinch rolls.

Although I have shown and described certain specific embodiments of my invention, I am fully aware that many modifications thereof are possible. My invention, therefore, is not to be restricted except insofar as is necessitated by the prior art.

I claim:

1. In a bonding machine for use in making bonds at a work station between elements carried on a perforated strip material and components to be added thereto, in combination;

first and second toothed wheels spaced apart on opposite sides of said work station and having substantially parallel rotational axis;

torquing means for urging said first wheel to rotate in one direction;

drive means for driving said second wheel in either of said one rotational direction or the opposite rotational direction in selected degrees; and positioning means for positioning the component to be added at said work station at a given position between said wheels.

2. The invention defined in claim 1 in which said drive means comprises means for rotating said second wheel in given angular increments; and which invention further comprises rotation superimposing means for rotating said second wheel through an angle independently of said drive means.

3. The invention defined in claim 2 in which said rotation superimposing means comprises a drive element mounted adjacent to, and concentric with, said second toothed wheel;

means for altering and fixing the relative rotation of said drive wheel and said second toothed wheel; and means for connecting said drive element to said drive means.

4. The invention defined in claim 1 in which said positioning means comprises a work table positioned at said work station between said first and second wheels and which further comprises means for moving a film strip extending between said wheels relative to said work station in the direction from one to the other of said wheels and in a direction transversed to said first mentioned direction.

5. The invention defined in claim 4 in which said table is movable in both lateral and transverse directions and which comprises means for moving at least one of said first and second wheels in said transverse direction.

6. The invention defined in claim 4 which further comprises means in the form of two film reels positioned in the plane of said first and second wheels and mounted for rotation on axis parallel with the rotational axis of said first and second wheel for permitting film reeled on one reel to be threaded over said first and second wheels and reeled on the other reel; and biasing means for biasing said reels to rotation such that said reels tend to pull in opposite directions on a film so threaded.

7. The invention defined in claim 6 in which said biasing means comprises at least one torque motor connected to both of said reels.

8. The invention defined in claim 6 which further comprises a work tool movable between a given position in said work station and position away from said given position.

9. The invention defined in claim 8 which further comprises means for providing a visual reference indicator of the position occupied by said work tool when in said work station.

10. In a bonding machine for use in making bonds at a work station between elements carried on a perforated strip material and components to be bonded to said elements, in combination:

tape transporting means for transporting the tape across the work station and comprising a sprocket wheel at the delivery side of said work station, means for rotating said sprocket wheel in selected degree to transport the tape in selected degree, and torque means at the opposite, take-up side of said work space for continually pulling the tape taut across said work space.

11. The invention defined in claim 10 in which said means for rotating said sprocket wheel comprises a shaft connected to the sprocket wheel and means for rotating the shaft through predetermined angular increments.

12. The invention defined in claim 11 in which said means for rotating said sprocket wheel further comprises means for altering the relative angular position of said shaft and said sprocket wheel.

13. The invention defined in claim 12 in which said torque means comprises a torque wheel rotatable on an axis parallel to said sprocket wheel and which further comprises means for translating said torque wheel in the direction of its axis.

14. The invention defined in claim 13 which further comprises a frame;

a tool holder mounted on said frame for rotation; and means for rotating said tool holder between a position at said work station and a position removed therefrom and for raising and lowering said tool holder while at said work station.

15. The invention defined in claim 14 which further comprises a work holder movable to a position in vertical alignment with said work position, and means for moving said work holder to and from said position.

16. The invention defined in claim 14 in which said tool holder comprises an arm, and floating bearing means for connecting a tool to said arm such that the tool extends with its working portion away from its connection to the arm and is free to move relative to the arm at the point of connection to the arm such that the direction in which the tool extends from the holder may change without material change in the position of said working portion of the tool.

17. The invention defined in claim 14 in which said means for translating the torque wheel in the direction of its axis comprises means for translating both the sprocket wheel and the torque wheel in the direction of their axis relative to said frame.

* * * * *